Dec. 17, 1968  N. J. DRISCOLL  3,417,212
SELECTIVELY OPERABLE CONTROL STATION AND ENCLOSURE
Filed April 5, 1967

United States Patent Office 3,417,212
Patented Dec. 17, 1968

3,417,212
SELECTIVELY OPERABLE CONTROL
STATION AND ENCLOSURE
Neil J. Driscoll, Los Angeles, Calif.
(20980 Costanso St., Woodland Hills, Calif. 91364)
Filed Apr. 5, 1967, Ser. No. 628,777
1 Claim. (Cl. 200—42)

ABSTRACT OF THE DISCLOSURE

A pushbutton control station is disclosed to provide switching means and enclosure useful in outdoor locations where the station is subject to varying climatic conditions. The station comprises a weatherproof enclosure having a cover with a central cavity receiving pushbuttons from an internal switching device. A boss above the cavity pivotally mounts a spring-loaded cover, the latter being normally biased to a closed cavity sealed position. The cover is manually raised to expose the buttons for actuation. The enclosure containing the switching device is provided with an extension defining a secondary housing. This housing has a boss on one side which mounts a key-operated switch. Terminal elements of the switch project within the secondary housing for electrical lead connection thereto. One lead may be connected to a current-carrying wire at station installation and the other lead may be connected to a terminal on the switching device in the primary enclosure. The station is normally mounted on an outdoor wall surface with the cover facing forwardly. An access opening to the secondary housing is directed oppositely from the face of the cover. A plate closes this opening. This opening and cover plate are therefore locked against the mounting wall surface after installation, thus preventing access to the terminals of the key switch. With the key switch open, power to the station is interrupted and the station is inoperative.

---

The invention relates to pushbutton control stations adaptable for use in outdoor locations whereat it is subject to varying climatic conditions and accessible to the general public. A key switch device is provided allowing for selective interruption of power to the unit.

The invention disclosed constitutes an improvement over the control stations disclosed in my Patent 3,180,962, dated Apr. 27, 1965, and entitled "Electrical Control Device and Enclosure Arrangement." The station employed in this disclosure is that shown and described in my Patent 3,185,803, dated May 25, 1965 and entitled "Push Button Switch With Flexible Contact." The detailed teachings of said patents are expressly incorporated herein by reference.

As noted in Patent 3,180,962, a major purpose of the structure disclosed is to offer a control device specifically designed for operation in a determined voltage range and suitable for installation in outdoor locations with appropriate device protection for all normally encountered climatic conditions. While the device as disclosed in said patent is entirely suitable for the service application described, in many outdoor installations the control is accessible to the general public. The control, for example, may be used to operate power equipment to open a service door or gate and allow access to a commercial warehouse, industrial plant, or similar installation. Security for such installations, of course, requires that controls that are accessible to the public be rendered inoperative when the installation is not occupied, such as at night or during a nonworking weekend. Of course, the control may be disconnected inside the plant or installation. This repeated operation is, of course, time consuming, and inconvenient. It further inconveniences late night deliveries and the like.

Accordingly, it is a primary feature of the disclosed invention to provide an electrical control station and enclosure arrangement suitable for outdoor public installation and having structure associated therewith whereby power to the station may be conveniently interrupted.

It is a particular object of the invention to provide a control station which includes a key switch device to selectively interrupt the current-carrying lead to the station.

It is yet another object of the invention to provide a control station including a primary weatherproof enclosure and a secondary housing for containing the key switch device.

It is still another object of the invention wherein a demountably-covered access opening to the secondary housing is directed oppositely from the face of the primary enclosure whereby after installation the access opening is flush against the mounting wall, thus preventing tampering with the key switch device.

Still another important object is to provide a control station, having the features described, that is extremely economical in initial cost.

These and other advantages and features of the invention will become apparent in the course of the following description and from an examination of the related drawings wherein.

Figure 1:
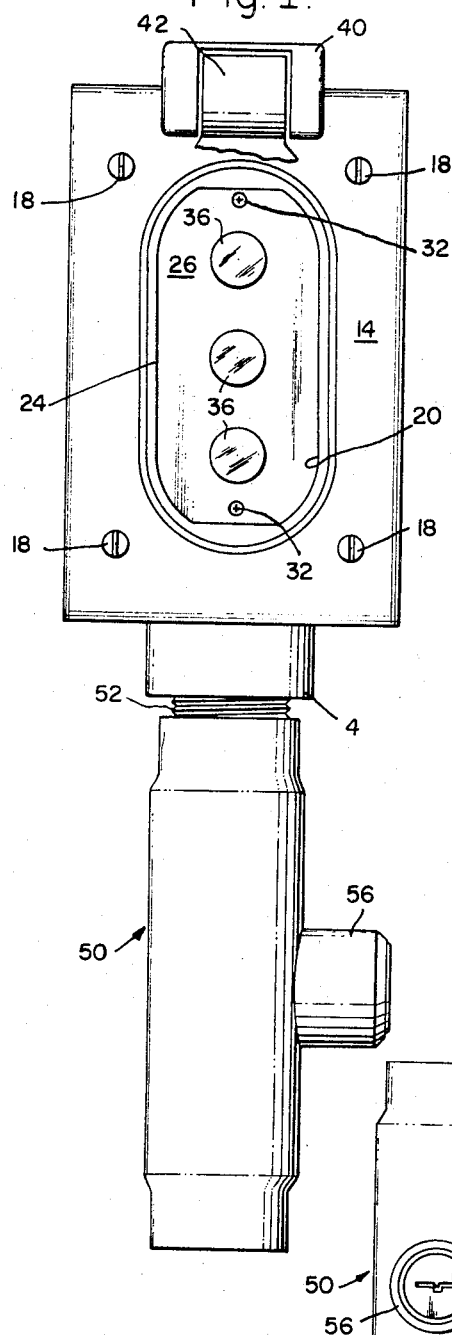
FIG. 1 is a partially fragmentary, front elevational view of the disclosed invention.

Referring to the drawings in the above-identified patent, it will be understood that a solid wall enclosure 2 is provided, preferably a casting, such as a cast aluminum box. One or more conduit couplings 4 having an appropriate conduit-receiving cavity 6 may be integrally formed with the enclosure 2. The front face of the enclosure 2 comprises fragmentary walls 8 and 10 which define with the side walls 7 and 9 of the enclosure 2, an opening 12.

A primary cover 14, again preferably of cast aluminum or the like, is congruently arranged on the front face of the enclosure 2 to uniformly fit thereon. In the assembled condition the primary cover 14 is mounted thereon by a plurality of screws 18, 18 and a sealing gasket (not shown) may be interposed between the cover 14 and the front face of the enclosure 2 to provide an effective weather seal therebetween.

The cover 14 further defines a central cavity 20 ringed by an upstanding annular continuous wall 24 and projecting upwardly from the surface of the cover 14. A secondary wall 26 is secured to the cover 14 on the inner side thereof and is used to mount a switching device indicated generally at 27 via screws 32, 32. The device 27 comprises manually operable pushbuttons 36, 36 which project through wall 26 into cavity 20 for operator access.

A bifurcated boss 40 is integrally formed with the cover above the cavity 20 and projects forwardly of the surface of the cover 14. A secondary cover 42 (here fragmentarily shown) is pivotally mounted from the boss 40 and spring loaded and normally covers from the cavity 20 when the control is not in use. The details of the structure described are clearly explained in Patent 3,180,-962.

As noted above, the particular control device and enclosure are adapted for installation in outdoor locations to safely seal the control from all normal climatic conditions. Also, as noted, some of these installations are of necessity in publicly accessible places, and, when the control is used to open access doors or gates for commrecial or industrial installations, the control unless deactivated, could be used by members of the public to gain entrance to the installation. It is a particular feature of the disclosed invention that the control has a unitary electrical key switch associated therewith whereby the control may only be energized by turning the key switch to closed position, the latter being restricted to authorized personnel in possession of the apprpriate key.

Figure 2:
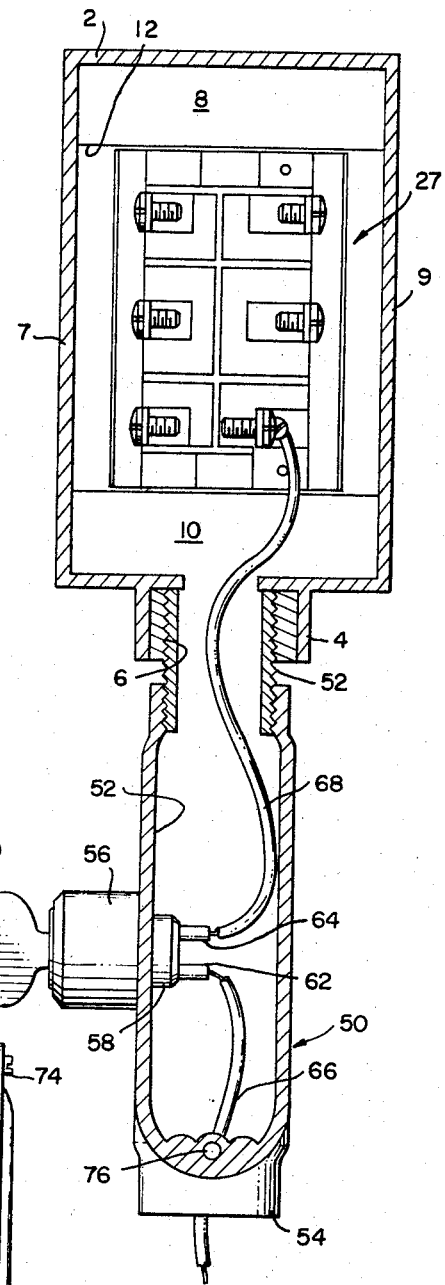
FIG. 2 is a rear elevational view of the structure shown in FIG. 1 with the rear walls removed to illustrate the relationship of the components contained therein.

Directing attention to FIGS. 1 and 2, it will be seen that a secondary housing indicated generally at 50 is provided, the housing being secured to the access boss 4 in any conventional manner such as, for example, by the close nipple 52 illustrated. The housing 50 defines a central cavity 52 and further comprises another coupling hub 54 projecting therebelow. An integral boss 56 forms part of the housing 50 and projects outwardly therefrom from one side thereof. The boss 56 provides a mode for mounting a conventional key operated switch 58 which is capable of opening and closing the connected circuit. The switch 58 may be provided with terminals 62 and 64 so that electrical leads may be attached thereto by soldering or any other conventional mode. A first lead 66 is provided which may be connected to a hot or power lead at installation and to terminal 62. A second lead 68 extends from terminal 64 to one of the terminals of the control device 27 as shown in FIG. 2. It will thus be seen that "hot" or power lead to the switching device 27 passes through the key switch 58 and that the electrical circuit may be opened or closed by turning the key 60. With the key switch 58 in open position, power to the control 27 is interrupted and the control 62 is inoperative even though pushbuttons 36, 36 are accessible. When it is desired to activate the control 27 by key-possessing authorized personnel, the operator merely inserts the key 60, closes the circuit via leads 66, 68, electrically energizing the control 27, and the buttons 36 may be pressed to operate the power device related to the control station and thereby open the gate, door, or the like.

Figure 3:
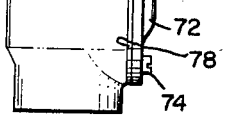
FIG. 3 is a fragmentary, detailed view of the key switch enclosure and its mode of cover access.

Directing attention to FIG. 3, an important feature of the invention is illustrated. Here the secondary housing 50 is shown in side elevational view taken from the right as shown in FIG. 1. It will be seen that access to the cavity 52 of the housing 50 is provided by a cover 72, the latter being secured in place by conventional screws 74, 74 which are received in tapped openings 76 of the housing 50. The cover 72 closes the opening to cavity 52 and a seal may be provided by interposed gasket 78. Considering FIGS. 1 and 3, it will be apparent that the access cover 72 is on the side of the composite unit opposed to the forwardly-directed surface of cover 14. That is, cover 14 and cover 78 face 180° in opposed directions.

The control station when installed is fixedly mounted on a wall or other surface with the cover 14 facing outwardly. A heavy-wall, electrical, wire-carrying conduit (not shown) is threadably connected to hub 54. The conduit enters the building to accommodate wire connection to a panel or controlled machine. When thus mounted, the cover 72 of the housing 50 is locked against the mounting wall. In this position it is impossible to gain entrance to cavity 52 of housing 50 to short circuit the key switch 58. Security for the installation is optimized even though the station is in a publicly accessible place.

In summary, it will be understood from the above description that a control station has been provided together with suitable enclosure adapting the station to outdoor installation yet protecting same from all climatic conditions in combination with appropriate structure to render the station inoperative to all but authorized personnel and provides an in-service installation that is effective and virtually tamper-proof.

The invention as disclosed is by way of illustration and not limitation and may be modified in many particulars, all within the scope of the appended claim.

What is claimed is:

1. In a surface mount weather-proof pushbutton control station arrangement, the combination of:
   a closed primary housing having a pushbutton station disposed therein with manually actuable button means exposed in a cavity on the front face wall of the primary housing,
   a spring biased cover connected to the front face wall and normally shielding said cavity,
   said cover being manually openable to expose the button means,
   said station including wire terminal means,
   a secondary housing physically connected to the primary housing,
   the secondary housing being provided with a closable access opening,
   said secondary housing having a demountable cover secured thereto to normally close and seal said access opening,
   said access opening being directed oppositely from the front face wall of said primary housing so that the demountable cover is in abutting engagement with the mounting surface at arrangement installation,
   said arrangement including passage means establishing communication between the housings,
   a key switch device carried by the secondary housing and having device wiring terminals disposed within the secondary housing,
   the key of said device extending externally of the secondary housing,
   and electrical lead means establishing electrical connection between at least one of said device wiring terminals and said terminal means,
   another electrical lead means accommodating connection of one of said device wiring terminals to a power source.

References Cited

UNITED STATES PATENTS 1,709,008    4/1929    Ennis et al. _____ 200—44 XR
3,180,962    4/1965    Driscoll.

ROBERT K. SCHAEFER, *Primary Examiner.*

H. BURKS, *Assistant Examiner.*

U.S. Cl. X.R.
200—159, 44